(12) United States Patent
Navarro

(10) Patent No.: US 8,838,854 B2
(45) Date of Patent: Sep. 16, 2014

(54) SWITCH THAT PROCESSES A TERMINAL DATA STREAM

(75) Inventor: Rex Dael Navarro, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 13/166,032

(22) Filed: Jun. 22, 2011

(65) Prior Publication Data

US 2012/0327298 A1 Dec. 27, 2012

(51) Int. Cl.
*G06F 13/38* (2006.01)
*G09G 5/00* (2006.01)
*G06F 3/14* (2006.01)

(52) U.S. Cl.
CPC .......... *G06F 3/1423* (2013.01); *G09G 2370/20* (2013.01); *G09G 2360/127* (2013.01); *G09G 2370/12* (2013.01); *G09G 2370/022* (2013.01); *G09G 5/008* (2013.01); *G09G 2354/00* (2013.01); *G06F 3/1454* (2013.01)
USPC ................................ 710/54; 710/65; 348/441

(58) Field of Classification Search
USPC .................................. 710/67, 65, 69; 348/441
See application file for complete search history.

(56) References Cited

U.S. PATENT DOCUMENTS

| 5,644,325 | A | * | 7/1997 | King et al. ..................... 345/20 |
| 5,675,390 | A | * | 10/1997 | Schindler et al. ............. 715/717 |
| 5,737,030 | A | * | 4/1998 | Hong et al. ..................... 725/41 |
| 6,069,621 | A | * | 5/2000 | Schupak ........................ 715/717 |
| 6,915,362 | B2 | | 7/2005 | Ramsey et al. |
| 7,725,626 | B2 | | 5/2010 | Chen et al. |
| 7,890,677 | B2 | | 2/2011 | Chandrasekhar et al. |
| 2002/0087760 | A1 | * | 7/2002 | Clapp et al. ..................... 710/62 |
| 2003/0043173 | A1 | * | 3/2003 | Wasserman et al. .......... 345/672 |
| 2007/0127523 | A1 | * | 6/2007 | Marrow ........................ 370/468 |
| 2009/0150532 | A1 | | 6/2009 | Chan et al. |

* cited by examiner

*Primary Examiner* — Ernest Unelus

(57) ABSTRACT

A terminal data stream (TDS) is received and converted in a pixel-based representation. The pixel-based representation is stored in a frame buffer and a video signal based on the contents of the frame buffer is provided to a video multiplexor. The video multiplexor is also coupled to a video signal from a computer system, and the video multiplexor routes the video signal from the frame buffer to a display device.

21 Claims, 6 Drawing Sheets

SWITCH THAT PROCESSES A TERMINAL DATA STREAM

BACKGROUND

In the art of computing, it is common for a workstation or server computer to include a management processor. A management processor may also be known by other names, including a baseboard management controller and a service processor.

Typically, the management processor manages lower level functions for the computer system. For example, the management processor may include temperature monitoring, fan controllers, and power monitoring. The management processor may also facilitate the hot-swapping of various components of the computer system. Finally, the management processor may participate in various out-of-band management schemes, such as Lights Out Management.

BRIEF DESCRIPTION OF THE DRAWINGS

The Figures depict examples, implementations, and configurations.

DETAILED DESCRIPTION

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom.

Examples relate to a switch that allows the human interface devices of a computer system to be used to also access a management processor associated with the computer system. In one example, that management processor may be accessed when other components of the computer system are in a standby state.

Figure 1:
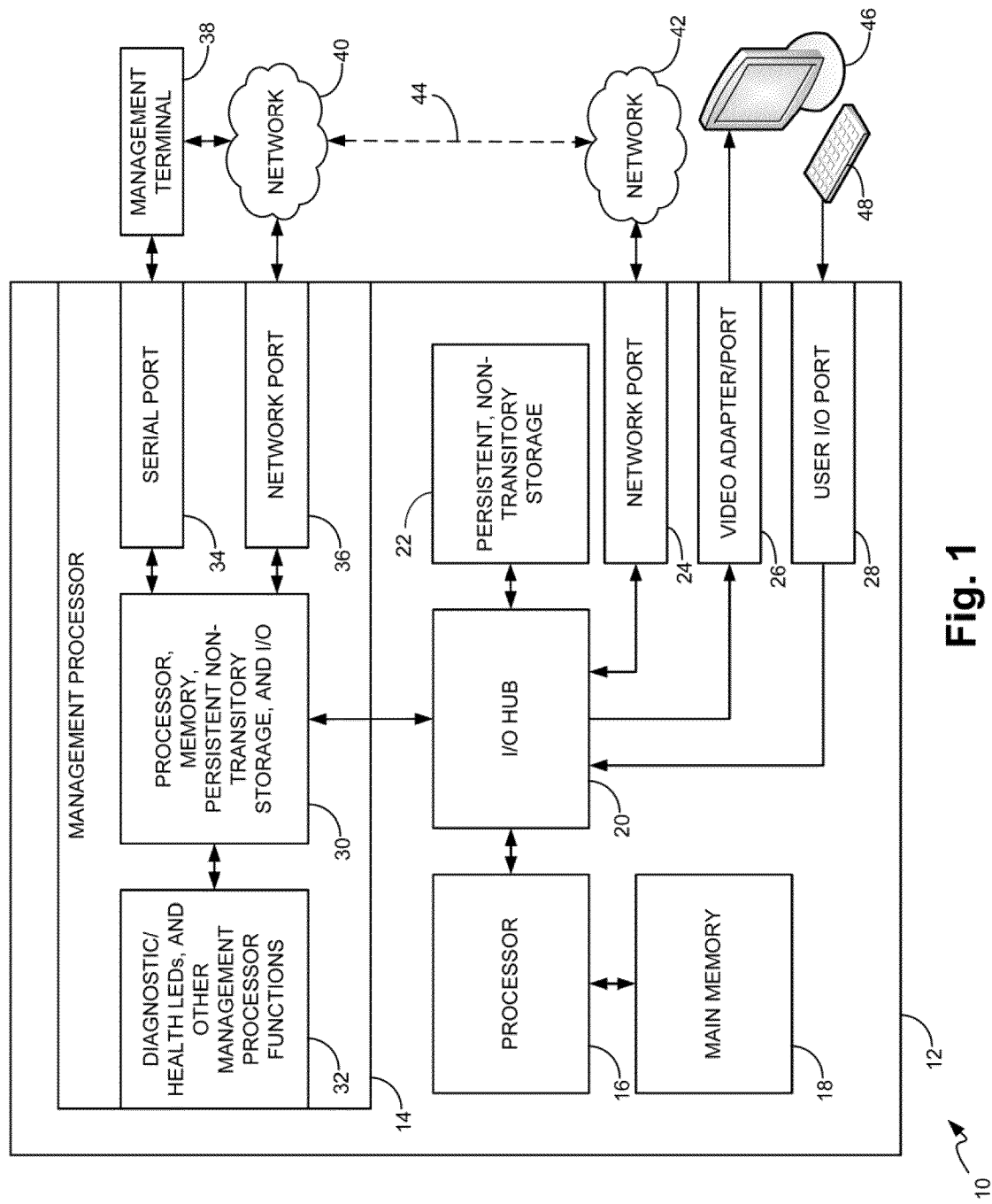
FIG. 1 shows an example computer system.

FIG. 1 shows an example computer system 10. Computer system 10 includes enclosure 12, management processor 14, processor 16, main memory 18, I/O hub 20, persistent non-transitory storage 22, network port 24, video adapter/port 26, and user I/O port 28. Management processor 14 includes processor, memory, persistent non-transitory storage and I/O 30, diagnostic/health LEDs and other management processor functions 32, serial port 34, and network port 36.

Management processors are often provided as a card that is installed in the computer system, but it is also known to have a management processor integrated with other components on a mainboard. The connection between I/O hub 20 and processor, memory, persistent non-transitory storage and I/O 30 represents the connection between management processor 14 and the rest of computer system 10, and may take other forms known in the art.

When configuring computer system 10, often management processor 14 will be configured first, and in turn, management processor 14 may perform further configuration tasks. One common way to configure management processor 14 is to initially connect a management terminal 38 to serial port 34, and configure various network parameters, such as the whether the management processor should use Dynamic Host Configuration Protocol (DHCP). For a manual configuration that does not use DHCP, parameters such as the IP address, subnet mask, DNS servers, and the default gateway need to be configured. Typically, communication between management terminal 38 and management processor 14 will occur using a terminal data stream (TDS) comprising characters and various control codes. For example, XTerm, ANSI, VT100, and other protocols based on the VTXX family of terminals are all common TDS formats known in the art, and there are many others.

Once the network configuration of management processor 14 has been established, management processor 14 may communicate view network port 36 and network 40. There may be a network connection to management terminal 38, or to any other computer or terminal that may be used to communicate with management processor 14. Network 40 may be a private network provided for communicating with management processors, or it may be part of a broader network, as represented by dotted line 44 connecting networks 40 and 42. Also shown in FIG. 1 is monitor 46 coupled to video adapter/port 26 of computer system 10, and keyboard 48 coupled to user I/O port 28 of computer system 10.

The configuration method discussed above works well for larger installations of computer systems. As installers provision computer systems, a portable management terminal may be connected for initial configuration via the serial port, and thereafter the management processor may be configured by via the network port and a computer or terminal coupled to the network.

However, the configuration method works less well for an installation having a single computer system or a small number of computer systems, such as an entry-level server or workstation in an office environment. Such an installation may not have a management network infrastructure, and it may not be practical to dedicate a management terminal for each computer system. It may also be inconvenient to move a management terminal from computer system to computer system. Also, note that in such an installation, it is common for a computer system to have dedicated input and display devices, in contrast to a data center where individual servers typically do not have dedicated input and display devices.

Note that in FIG. 1, some of the lines depicting dataflow have arrows pointing in a single direction, while others lines are shown as bi-directional. The arrows merely define a primary flow of information, and those skilled in the art will understand that most data connections have data flowing in both directions. For example, it is common to have various clocking and handshaking signals flow in both directions. Furthermore, secondary data may flow in a direction opposite to the direction of the primary data flow. For example, it is common for display devices to provide Extended Display Identification Data (EDID) back to a computer system, so in FIG. 1, display device 46 may provide EDID to computer system 10, even though the line coupling display device 46 to computer system 10 only has an arrow in the direction of a data flow to display device 46.

Figure 2:
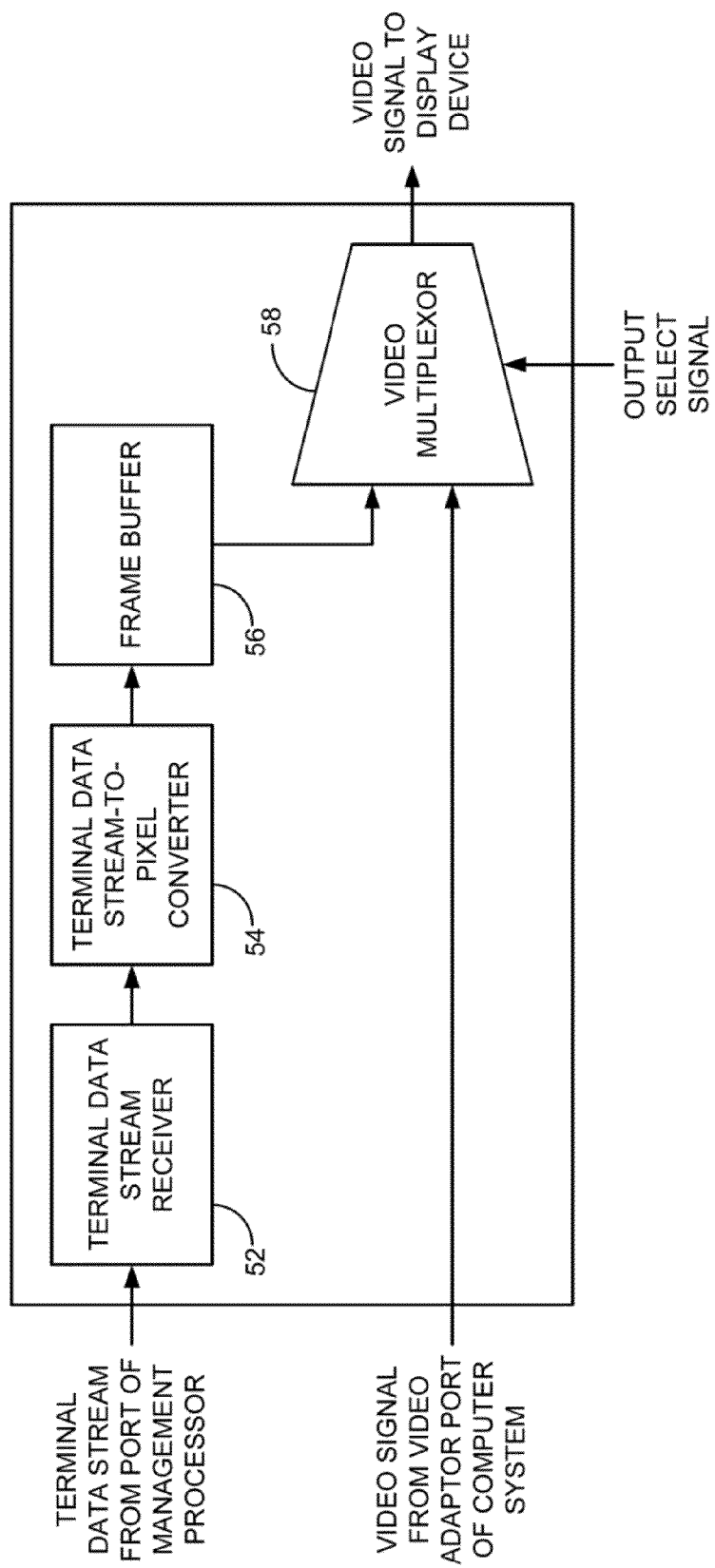
FIG. 2 is a block diagram of a switch that can toggle between a computer video signal and a video signal rendered from a terminal data stream from a management processor.

FIG. 2 is a block diagram of a switch 50 that can use a display device provided for normal computer display tasks to also display a terminal data stream from the management processor. Switch 50 includes terminal data stream receiver 52, which receives a terminal data stream from a management processor. For example, terminal data stream receiver 52 could be coupled to serial port 34 of management processor 14 of FIG. 1.

Terminal data stream receiver 52 is coupled to terminal data stream-to-pixel converter 54, which in turn is coupled to frame buffer 56. Terminal data stream-to-pixel converter 54 receives a stream of characters and control codes, creates a pixel-based representation of the characters and control codes, and renders the pixel-based representation into frame buffer 56. The output of frame buffer 56 is a video signal that represents the characters and control codes provided in the terminal data stream. The output of frame buffer 56 is provided to video multiplexor 58.

Switch 50 also receives a video signal from a video adapter port of a computer system, and the video signal is provided to video multiplexor 58. Video multiplexor 58 also receives an output select signal, which instructs video multiplexor 58 to couple either the output of frame buffer 56 or the video signal from the video adapter port of the computer system to the display device. Accordingly, switch 50 of FIG. 2 shows an example of a switch having the ability to render a terminal data stream into a frame buffer, and switch 50 may be used to visualize output from a management processor using an existing display device associated with the computer system.

Figure 3:
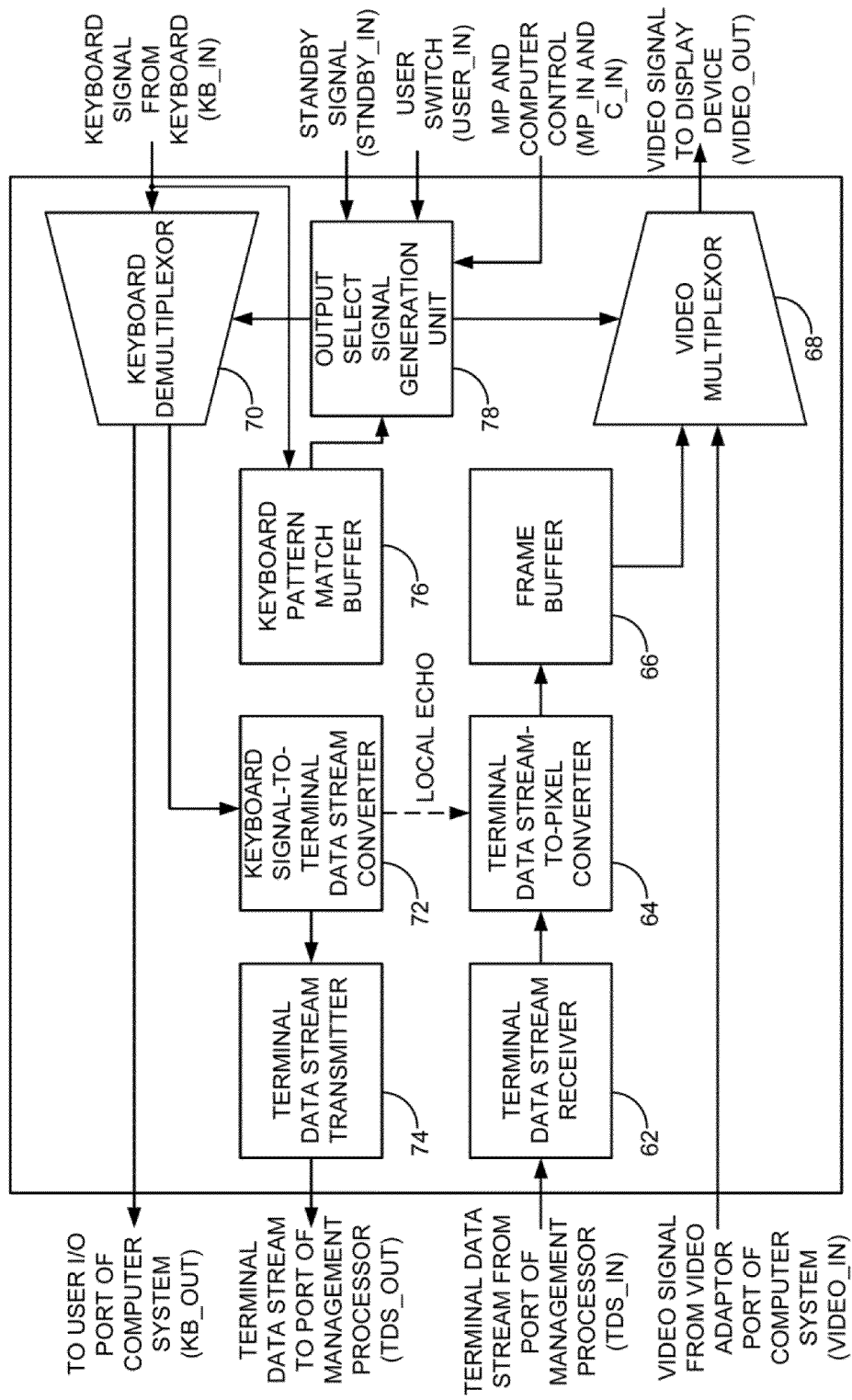
FIG. 3 is a block diagram of a switch that can toggle both a display device and a keyboard between a computer system and a terminal data stream of a management processor.

Switch 50 of FIG. 2 illustrates how a display device may be shared to display video from both a management processor and a display port of a computer system. FIG. 3 is a block diagram of switch 60 that also shares the keyboard, and provides additional options for generating the output select signal. Switch 60 may be provided as a stand-alone add-on accessory that could be coupled to a computer system such as computer system 10 of FIG. 1, or may be integrated into a computer system, as will be discussed below with reference to FIG. 4.

Switch 60 includes terminal data stream receiver 62, terminal data stream-to-pixel converter 64, frame buffer 66, video multiplexor 68, keyboard demultiplexor 70, keyboard signal-to-terminal data stream converter 72, terminal data stream transmitter 74, keyboard pattern match buffer 76, and output select signal generation unit 78.

Before discussing switch 60, first consider the various signals shown in FIG. 3. It is common for a maintenance port on a management processor to have an RS-232 serial port. However, other types of ports known in the art may be used, such a Universal Serial Bus (USB) port or a Firewire® port.

Similarly, many methods are known for carrying video signals. For example, a Video Graphics Array (VGA) port is a common port for providing an analog computer display output, and a Digital Visual Interface (DVI) port and a DisplayPort are common ports for providing digital computer display outputs. Of course, other display interface technologies are also known in the art. In general, these display technologies provide analog or digital signals that represent pixels at a specified refresh rate.

Several methods are also known in the art for carrying keyboard signals. For example, the USB and PS/2 interfaces may be used to carry keyboard signals. Those skilled in the art will appreciate how the teachings disclosed herein may be adapted to accommodate any method of carrying video, keyboard, and terminal data stream signals. Of course, the teachings disclosed may also be adapted to carry other types of user interface signals, such as audio data and input data from a pointing device or touchscreen.

Returning to switch 60 of FIG. 3, the video portion of switch 60 is similar to switch 50 of FIG. 2. Accordingly, terminal data stream receiver 62 receives a terminal data stream from a management processor, such as a stream from serial port 34 of management processor 14 of FIG. 1. Terminal data stream receiver 62 is coupled to terminal data stream-to-pixel converter 64, which in turn is coupled to frame buffer 66. Terminal data stream-to-pixel converter 64 receives a stream of characters and control codes, creates a pixel-based representation of the characters and control codes, and renders the pixel-based representation into frame buffer 66. The output of frame buffer 66 is a video signal that represents the characters and control codes provided in the terminal data stream. The output of frame buffer 66 is provided to video multiplexor 68. Switch 60 also receives a video signal from a video adapter port of a computer system, and the video signal is provided to video multiplexor 68. Video multiplexor 68 also receives an output select signal from output select signal generation unit 78, which will be discussed in greater detail below. The output select signal instructs video multiplexor 68 to couple either the output of frame buffer 66 or the video signal from the video adapter port of the computer system to the display device.

As mentioned above, switch 60 also accommodates keyboard input. Accordingly, a keyboard signal, such as a signal from keyboard 48 of FIG. 1, may be coupled to keyboard demultiplexor 70. Keyboard demultiplexor 70 also receives an output select signal from output select signal generation unit 78. Note that unit 78 may signal keyboard demultiplexor 70 to couple the keyboard to the user I/O port of the computer system, such as user I/O port 28 of computer system 10 of FIG. 1. Alternatively, unit 78 may signal demultiplexor 70 to couple the keyboard to keyboard signal-to-terminal data stream converter 72. Converter 72 takes the output of the keyboard and creates an outgoing terminal data stream that is transmitted to terminal data stream transmitter 74, which in turn is provided to a terminal data stream port of a management processor, such as serial port 34 of management processor 14 shown in FIG. 1.

In the art of terminal communications, it is known to provide both local echoes and remote echoes. When a remote echo is provided, a typed character is transmitted to a destination device, and the destination device echoes back the character. Accordingly, a typed character would flow out transmitter 74 and an echo would be received by receiver 62 and be rendered into frame buffer 66 by converter 64.

When a local echo is provided, the typed character is provided directly from keyboard signal-to-terminal data stream converter 72 to terminal data stream-to-pixel converter 64, which in turn renders the typed character into frame buffer 66. The optional local echo path is represented in FIG. 3 by the dotted line connecting converters 72 and 64.

Output select signal generation unit 78 generates an output select signal that is provided to both video multiplexor 68 and keyboard demultiplexor 70. The output select signal determines whether switch 60 is providing access to the management processor or the main I/O ports of the computer system. In FIG. 3, five methods of generating the output select signal are presented.

One method is to generate the output select signal based on a received keyboard pattern. Using this method, keyboard streams are provided from the input of keyboard demultiplexor 70 to keyboard pattern match buffer 76. Buffer 76 monitors the stream of characters from the keyboard and detects patterns intended to affect the output select signal. For example, buffer 76 could generate a signal to select the management processor upon detecting a sequence of CTRL-ALT-MP. Similarly, the primary display and keyboard interfaces of the computer system could be selected upon detecting a sequence of CTRL-ALT-CS. Finally, a detected sequence of CTRL-ALT-TG could be used to toggle the output select signal. Of course, any appropriate key sequence can be used.

Another method for generating the output select signal is to base the signal on a computer system standby state. Several standby states are known in the art, including the S3 sleep state and the S4 hibernation state. During these states, typically the video port of a computer system will be inactive, but the management processor will remain powered up and active. Accordingly, output select signal generation unit 78 may be configured to switch to the management processor upon detecting that certain components of the computer system have entered a standby state.

Yet another method for generating the output select signal is via a direct interface between output select signal generation unit 78 and a signaling processor, such as the management processor or the primary processor of the computer system. Such an interface provides a programmatic link that allows software executing from either the management processor or the primary computer system processor to change the output select signal. Finally, note that output select signal generation unit 78 may receive input from a user selection switch. Both the programmatic interface and user selection switch will be discussed below with reference to FIG. 4.

Note that each of the input and output signals shown in FIG. 3 includes a signal name (e.g., KB_OUT and STND-BY_IN). These signals are used with reference to the switch shown in FIG. 4.

Figure 4:
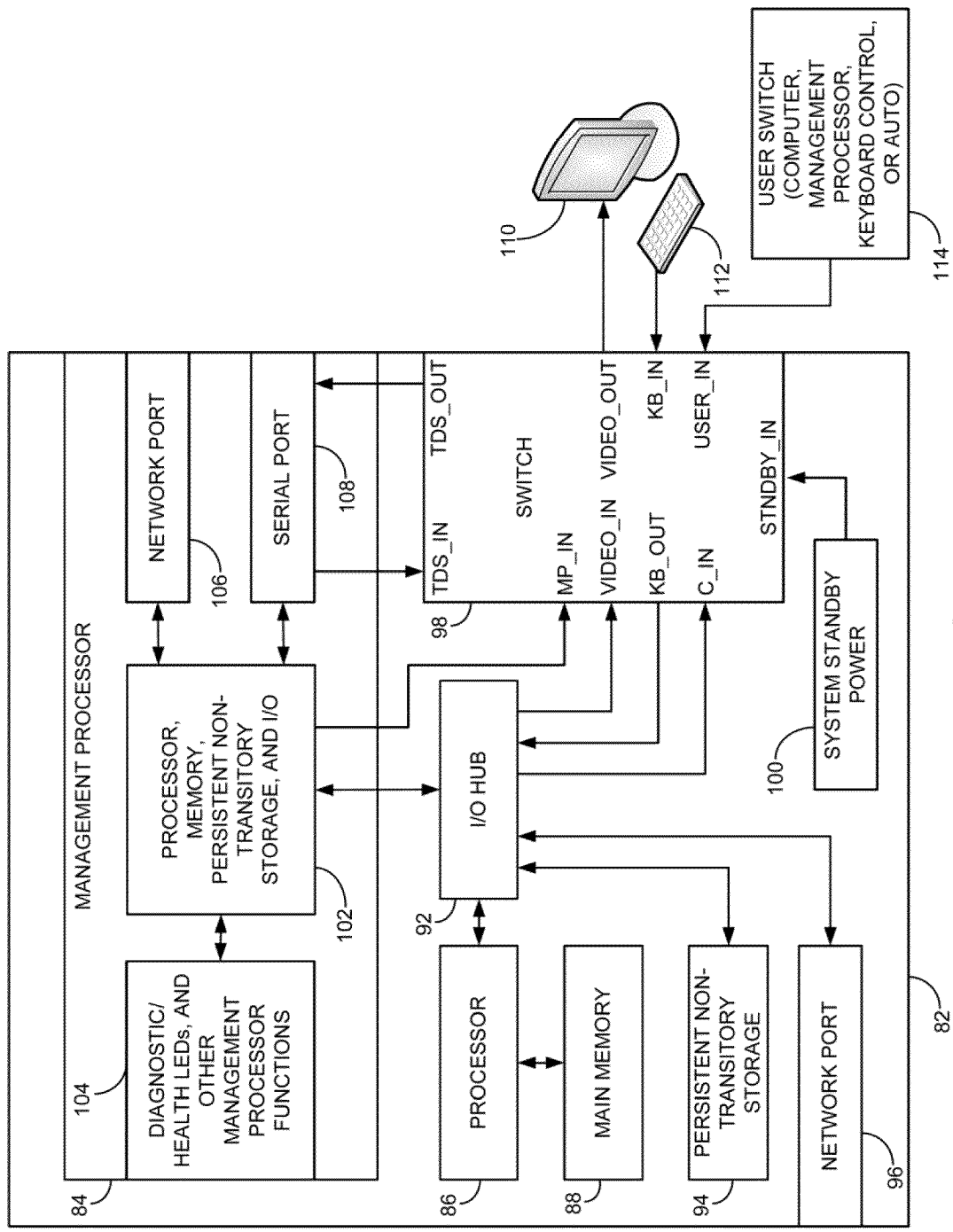
FIG. 4 is a block diagram of a computer system that includes an integrated version of a switch similar to the switch of FIG. 3.

FIG. 4 is a block diagram of a computer system 80 that includes an integrated version of switch 60 of FIG. 3. Computer system 80 is housed in enclosure 82, and includes management processor 84, processor 86, main memory 88, I/O hub 92, persistent non-transitory storage 94, network port 96, switch 98, and system standby power 100. Management processor 84 includes processor, memory, persistent non-transitory storage, and I/O 102, diagnostic/health LEDs, and other management processor functions 104, network port 106, and serial port 108. Finally, computer system 80 is coupled to display device 110, keyboard 112, and user switch 114.

Note that switch 98 is substantially similar to switch 60 of FIG. 3, and the signal names associated with switch 98 correspond to the signal names associated with switch 60 of FIG. 3. Accordingly, the TDS_IN and TDS_OUT ports of switch 60 are coupled to serial port 108 of management processor 84 to provide switch 98 with access to the terminal data stream available at serial port 108. As depicted in FIG. 3, serial port 108 is shown as being coupled to the TDS_IN and TDS_OUT ports of switch 60, and is also shown as being accessible from the exterior of enclosure 82. Typically an RS-232 serial port does not support multiple connection points in this manner. However, those skilled in the art will appreciate that the configuration shown in FIG. 3 could be supported by a user switch that switches between external access or internal access via switch 60, or an insertion detection mechanism that detects when an external device is coupled to serial port 108.

The MP_IN port of switch 98 is coupled to processor, memory, persistent non-transitory storage, and I/O 102. Accordingly, under control of program codes executed by processor, memory, persistent non-transitory storage, and I/O 102, management processor 84 may change the output select signal within switch 98 and discussed in greater detail with reference to switch 60 of FIG. 3. A typical operational example is a user typing a command into a command line interface provided by management processor 84 to cause management processor 84 to signal switch 98 to switch display device 110 and keyboard 112 to the video and keyboard ports associated with processor 86.

The VIDEO_IN port of switch 98 receives a video signal from I/O hub 92. Note that it is common for video controllers to be implemented in I/O hubs, as shown in FIG. 4. However, it is also common to provide a video card in a slot, such as a Peripheral Component Interconnect Express (PCIe) slot. It will be understood by those skilled in the art the configuration shown in FIG. 4 could be easily modified to support a discrete video card.

The KB_OUT port of switch 98 is also coupled to I/O hub 92 to provide a path from keyboard 112 through switch 98 to I/O hub 92. As discussed above, the keyboard connection may be implemented as a USB connection, a PS/2 connection, or any other connection suitable for carrying a keyboard signal.

The C_IN port is used to provide an interface to switch 98 that allows processor 86 to set the output select signal within switch 98 under program control of processor 86. For example, a user could click an icon on the desktop to access management processor 84, or select access to management processor 84 from with an administration program being executed by processor 86.

System standby power 100 is provided to the STNDBY_IN port of switch 98. System standby power 100 may provide power to switch 98 when other components of computer system 80 have entered a sleep state, and may also be used as a trigger signal to the output select signal generation unit, as discussed in greater detail with reference to unit 78 of FIG. 3. As mentioned above, it is common for a management processor to remain powered up and operational when other components of a computer system enter a sleep state.

The USER_IN port of switch 98 is coupled to a user switch, which may be provided in any location that provides access to the user. As shown in FIG. 4, user switch 114 has four settings: Computer, Management Processor, Keyboard Control, or Auto. The Computer setting signals switch 98 to couple display device 110 and keyboard 112 to I/O hub 92. The Management Processor setting signals switch 98 to couple display device 110 and keyboard 112 to management processor 84 using the terminal data stream conversions discussed above. The Keyboard Control setting couples display device 110 and keyboard 112 to the appropriate components based on a keyboard pattern match, as discussed in greater detail above with reference to FIG. 3. Finally, the Auto setting allows switching via automatic detection of standby power and under programmatic control or either management processor 84 or processor 86. Those skilled in the art will recognize that these options may be combined in various ways using various priorities. For example, a programmatic directive could be configured to take priority over a keyboard pattern match, or vice versa. Similarly, all options could have equal priority, with the most recently received option setting the output select signal.

Figure 5:
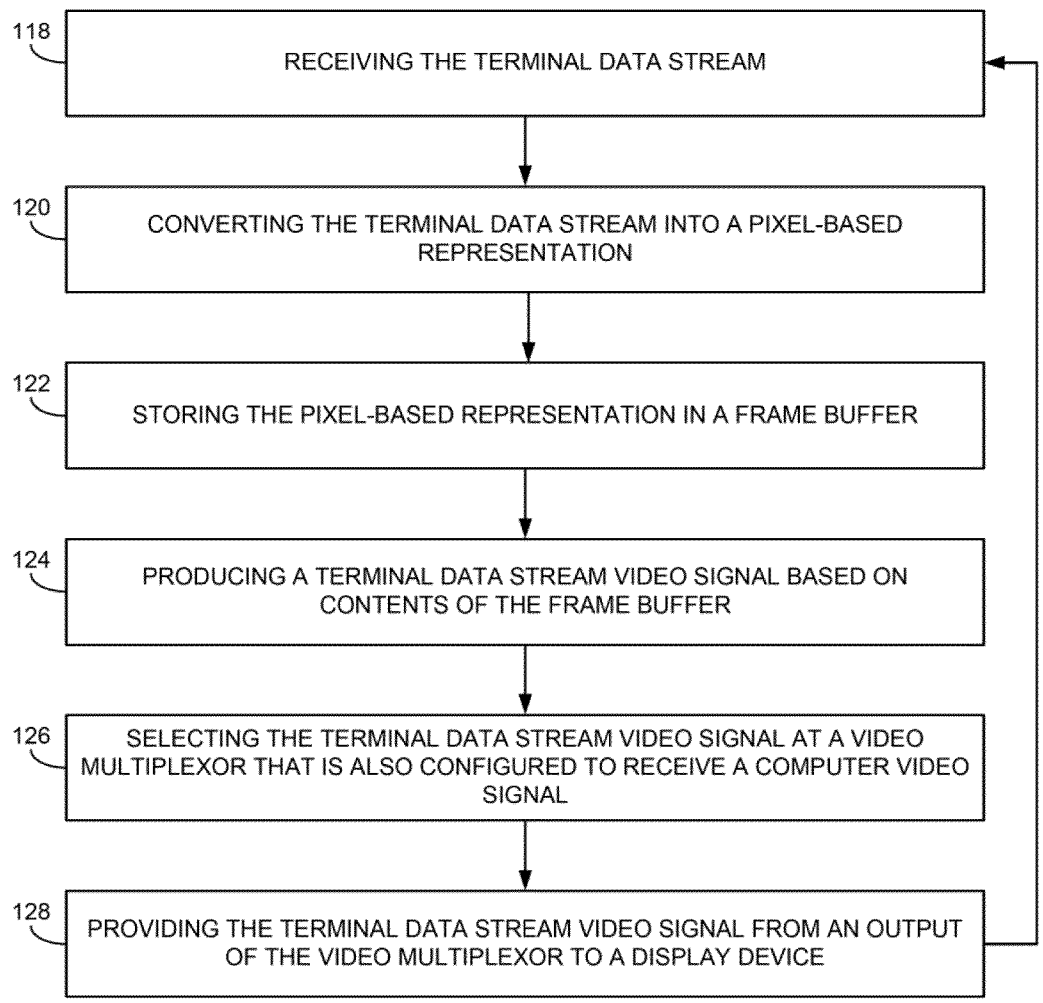
FIGS. 5 and 6 are flow charts illustrating example methods.

FIG. 5 shows a flow chart 116 that illustrates an example method. The method begins at block 118 where a terminal data stream is received. Control flows to block 120, where the terminal data stream is converted into a pixel-based representation. Control passes to block 122.

At block 122, the pixel-based representation is rendered into a frame buffer, and control passes to block 124 where a terminal data stream video signal is produced based on the contents of the frame buffer. Control passes to block 126.

At block 126, a video multiplexor is used to select the terminal data stream video signal. The video multiplexor is also connected to a video signal from a computer system, which is also selectable by the video multiplexor. Control passes to block 128, where the video multiplexor provides the terminal data stream video signal to a display device. Control passes back to block 118 and the method repeats.

Figure 6:
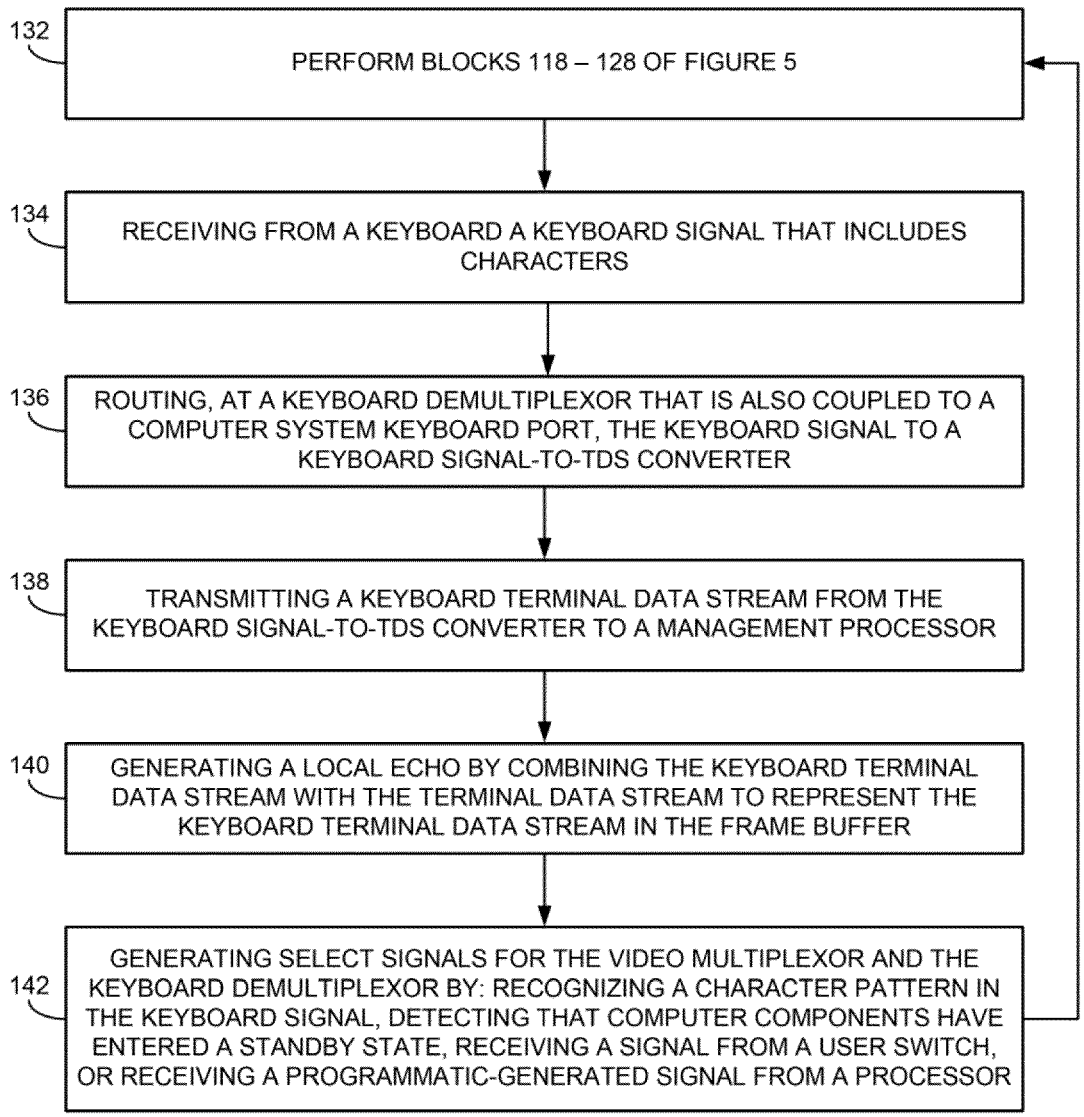

FIG. 6 shows a flow chart 130 that performs additional example tasks. At block 132, blocks 118-128 of FIG. 5 are performed, as discussed above, and control passes to block 134. At block 134, a keyboard signal is received from a keyboard, with the keyboard signal including characters. Control passes to block 136.

At block 136, a keyboard demultiplexor is used to route the keyboard signal to a keyboard signal-to-TDS converter. The demultiplexor is also capable of routing the keyboard signal to a keyboard port of a computer system. Control passes to block 138.

At block 138, the keyboard terminal data stream from the keyboard signal-to-TDS converter is transmitted to a management processor. Control passes to block 140 where a local echo is generated by combining the keyboard terminal data stream with the terminal data stream generated received at block 118 in FIG. 5 to represent the keyboard terminal data stream in the frame buffer. Control passes to block 142.

Block 142 represents several methods of generating the select signals provided to the video multiplexor and the keyboard demultiplexor, including recognizing a character pattern in the keyboard signal, detecting that computer components have entered a standby state, receiving a signal from a user switch, and receiving a programmatic-generated signal from a processor. Control loops back to block 132, and the method repeats.

The examples presented herein are well adapted to providing access to a management processor in a computer system that is not coupled to a dedicated management processor communication network, but does have display devices and keyboards. Of course, the examples may also be deployed in other computer system configurations. By using existing display devices and keyboards, access to a management processor may be provided at little additional cost, and without dedicated additional space for management terminals.

In one example, a switch may be provided as an accessory in the form of a separate component. For example, switch 60 of FIG. 3 may be coupled between computer system 10 and keyboard 48 and display device 46 of FIG. 1. In another example, a switch may be integrated into a computer system, as shown in computer system 80 of FIG. 4.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

What is claimed is:

1. A switch comprising:
a switch video input for receiving a first video signal that includes pixel data;
a terminal data stream (TDS) data receiver for receiving an incoming TDS comprising characters and control codes from a baseboard management controller;
a frame buffer for producing a TDS video signal based on data stored in the frame buffer;
a TDS-to-pixel converter coupled to the TDS data receiver and the frame buffer, for converting the incoming TDS into a pixel representation and storing the pixel representation in the frame buffer; and
a video multiplexor having inputs coupled to the switch video input and the TDS video signal, and providing a switch output suitable for connection to a display device, the video multiplexor switching between the switch video input and the TDS video signal based on an output select signal.

2. The switch of claim 1 and further comprising:
a TDS data transmitter for sending an outgoing TDS;
a keyboard input from a keyboard;
a keyboard output;
a keyboard output-to-TDS converter coupled to the TDS data transmitter, for converting a keyboard signal from the keyboard input into the outgoing TDS; and
a keyboard demultiplexor coupled to the keyboard input, the keyboard output-to-TDS converter, and the keyboard output, for selectively coupling the keyboard input to either the keyboard output-to-TDS converter or the keyboard output based on the output select signal.

3. The switch of claim 2 wherein the keyboard input and the keyboard output comprise universal serial bus (USB) connections.

4. The switch of claim 2 and further comprising:
a pattern match buffer configured to monitor the keyboard input and generate the output select signal based on a matched pattern entered from a keyboard coupled to the keyboard input.

5. The switch of claim 1 and further comprising:
a standby power unit, for signally when a computer coupled to the switch has entered a standby state; and
an output select signal generation unit, for generating the output select signal based on whether the computer has entered the standby state, wherein the switch is to output the TDS video signal to the display device automatically in response to the computer entering the standby state.

6. The switch of claim 1 and further comprising:
a user switch, for generating the output select signal based on a state selected by a user.

7. A computer system comprising:
a processor;
memory coupled to the processor;
a video port that provides a port video signal;
a baseboard management controller having a terminal data stream (TDS) port;
a frame buffer for producing a TDS video signal based on data stored in the frame buffer;
a TDS-to-pixel converter coupled to the TDS port and the frame buffer, for converting characters and control codes from the TDS port into a pixel representation and storing the pixel representation in the frame buffer; and
a video multiplexor coupled to the TDS video signal and the port video signal, and providing an external video output for connection to a display device, the video multiplexor switching between the TDS video signal and the port video signal based on an output select signal.

8. The computer system of claim 7 and further comprising:
a keyboard input;
an I/O hub coupled to the processor, the I/O hub including a keyboard interface;
a keyboard signal-to-TDS converter coupled to the TDS port of the management processor, for converting characters from the keyboard input into a keyboard TDS; and
a keyboard demultiplexor coupled to the keyboard input, the keyboard interface, and the keyboard signal-to-TDS converter, the keyboard demultiplexor switching between the keyboard interface and the keyboard signal-to-TDS converter based on the output select signal.

9. The computer system of claim 8 and further comprising:
a pattern match buffer configured to monitor the keyboard input and generate the output select signal based on a matched pattern entered from a keyboard coupled to the keyboard input.

10. The computer system of claim 7 wherein the video multiplexor includes a programmatic interface for generating the select signal in response to computer instructions executed by a signaling processor.

11. The computer system of claim 10 wherein the programmatic interface is coupled to the management processor, and the management processor contains the signaling processor that executes the computer instructions.

12. The computer system of claim 10 wherein the programmatic interface is coupled to the processor, with the processor is the signaling processor that executes the computer instructions from the memory.

13. The computer system of claim 7 wherein the processor is capable of entering a standby state while the management processor is active, and the output select signal is generated from the standby state.

14. A method of providing access to a terminal data stream (TDS) comprising:
receiving the TDS from a baseboard management controller;
converting the TDS into a pixel-based representation with an electronic TDS-to-pixel converter;
storing the pixel-based representation in a frame buffer;
producing a TDS video signal based on contents of the frame buffer;
selecting the TDS video signal at a video multiplexor having inputs coupled to a video input and the TDS video signal, and having an output suitable for connection to a display device, the video multiplexor switching between the video input and the TDS video signal based on an output select signal; and
providing the TDS video signal from the output of the video multiplexor to the display device.

15. The method of claim 14 and further comprising:
receiving from a keyboard a keyboard signal that includes characters;
routing, at a keyboard demultiplexor that is also coupled to a computer system keyboard port, the keyboard signal to a keyboard signal-to-TDS converter; and
transmitting a keyboard TDS from the keyboard signal-to-TDS converter to the management processor.

16. The method of claim 15 and further comprising:
generating a local echo by combining the keyboard TDS with the TDS to represent the keyboard TDS in the frame buffer.

17. The method of claim 15 and further comprising:
generating select signals for the video multiplexor and the keyboard demultiplexor by recognizing a character pattern in the keyboard signal.

18. The method of claim 14 and further comprising:
generating a select signal for the video multiplexor to provide the TDS video signal to the display device automatically in response to detecting that computer components have entered a standby state.

19. The method of claim 14 and further comprising:
generating a select signal for the video multiplexor based on a signal from a user switch.

20. The method of claim 14 and further comprising:
generating a select signal for the video multiplexor based on a programmatic signal from a processor.

21. The switch of claim 1, wherein the terminal data stream comprises a protocol selected from a group of protocols consisting of: X-Windows Terminal (XTerm), American National Standard Institute (ANSI), Virtual Terminal 100 (VT100) and protocols based on the Virtual Terminal (VTXX) family of terminals.

* * * * *